No. 615,396. Patented Dec. 6, 1898.
C. H. W. LARRABEE.
COMBINED AMBULANCE AND TOURIST WAGON.
(Application filed July 29, 1898.)
(No Model.) 5 Sheets—Sheet 1.
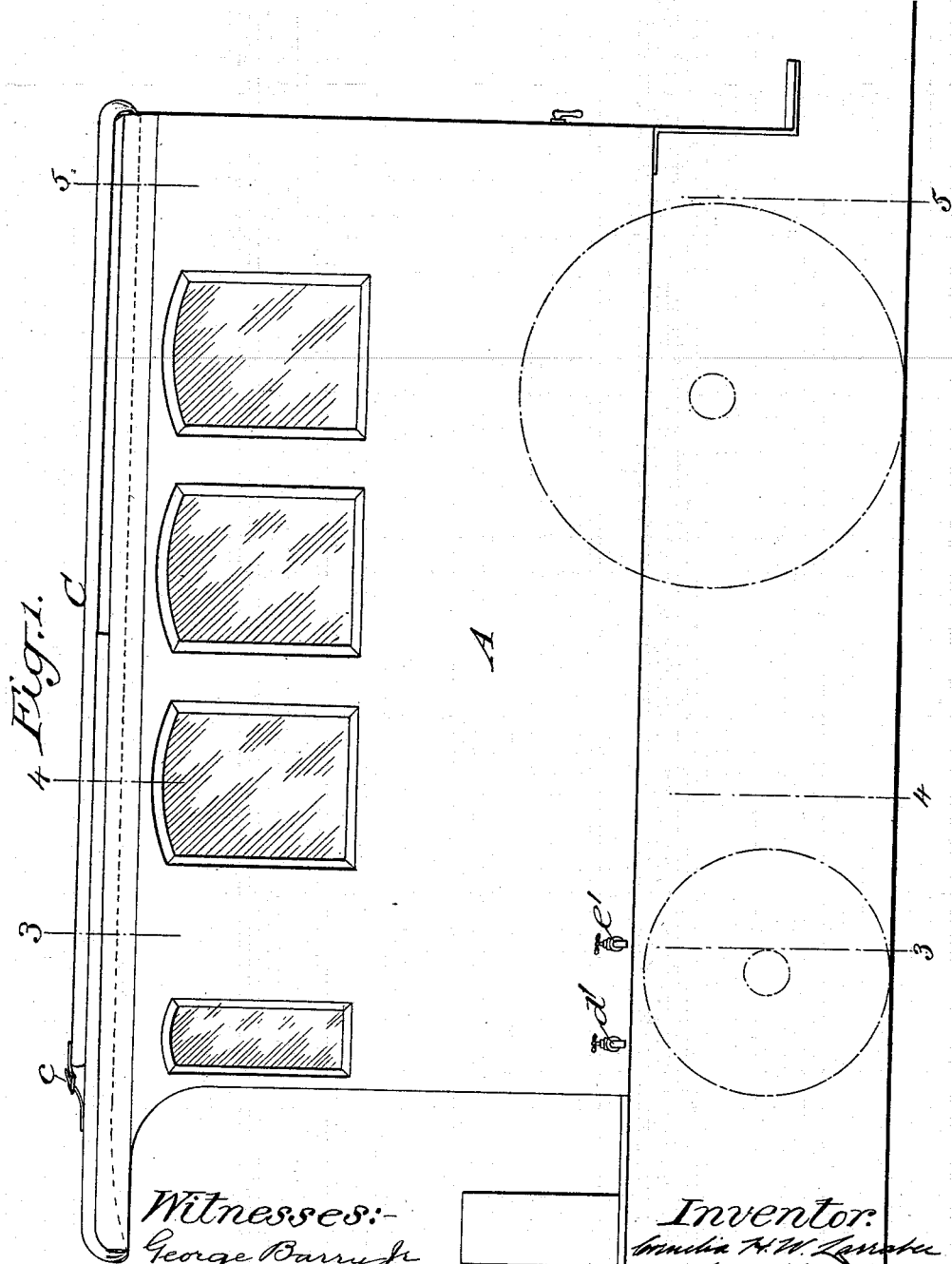

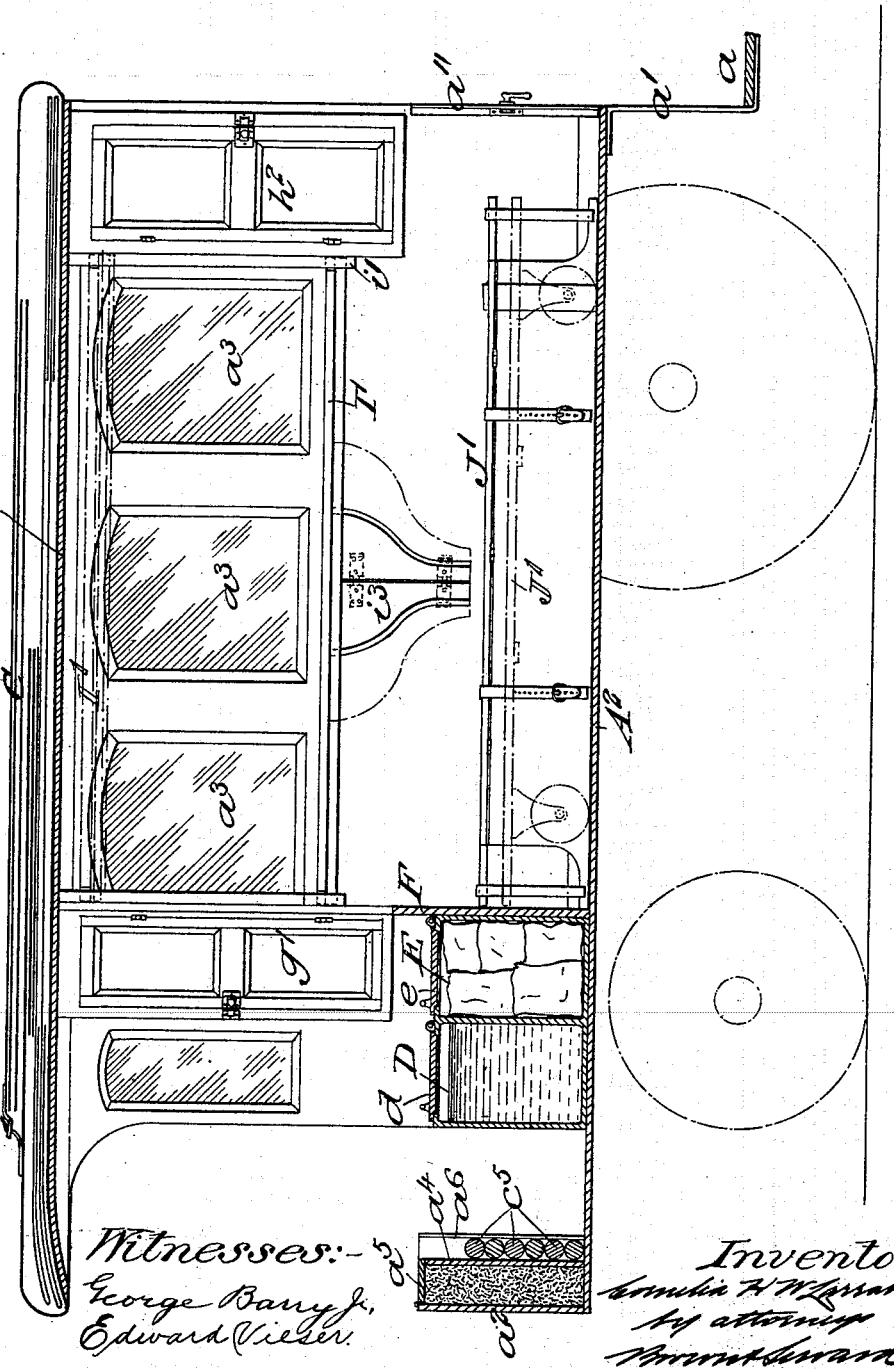

No. 615,396. Patented Dec. 6, 1898.
C. H. W. LARRABEE.
COMBINED AMBULANCE AND TOURIST WAGON.
(Application filed July 29, 1898.)
(No Model.) 5 Sheets—Sheet 3.
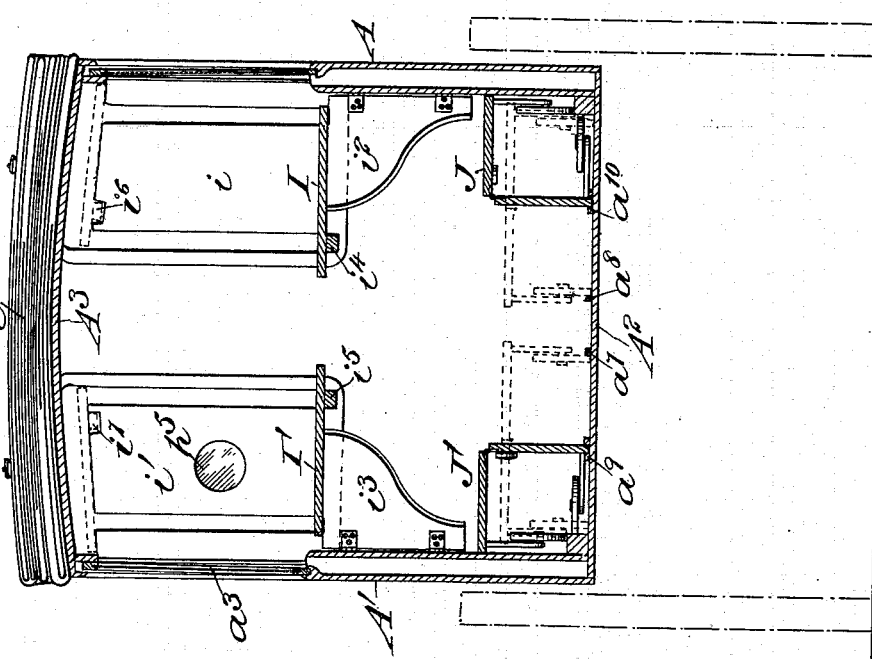
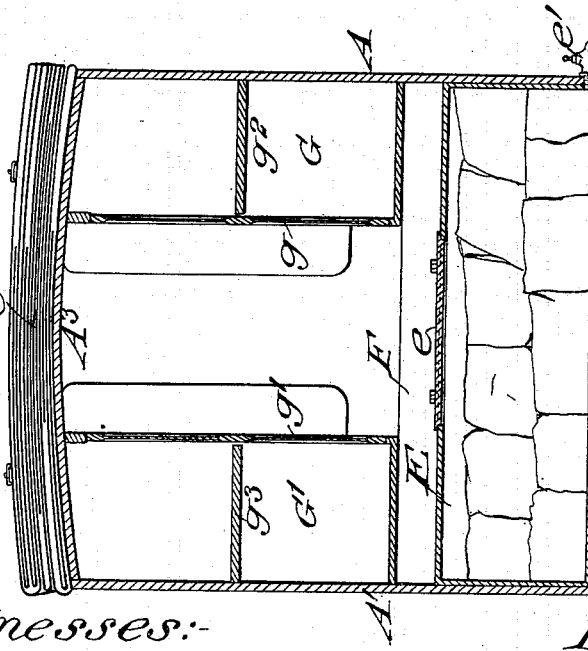
Witnesses:
George Barry Jr.
Edward Vilser.
Inventor:
Cornelia H. W. Larrabee
by attorneys
THE NORRIS PETERS CO., PHOTO-LITHO., WASHINGTON, D. C.

No. 615,396. Patented Dec. 6, 1898.
C. H. W. LARRABEE.
COMBINED AMBULANCE AND TOURIST WAGON.
(Application filed July 29, 1898.)
(No Model.) 5 Sheets—Sheet 4.
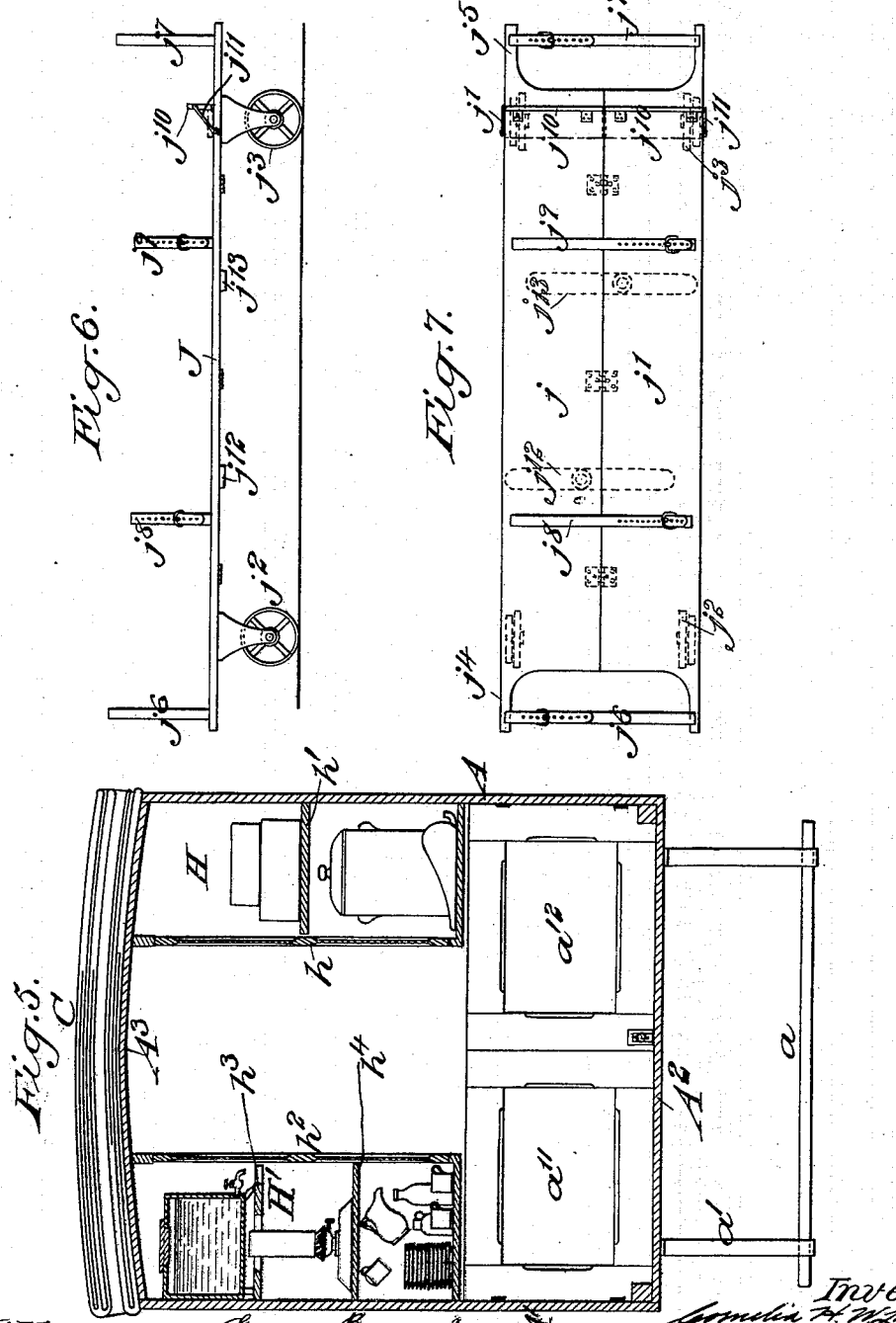

No. 615,396. Patented Dec. 6, 1898.
C. H. W. LARRABEE.
COMBINED AMBULANCE AND TOURIST WAGON.
(Application filed July 29, 1898.)
(No Model.) 5 Sheets—Sheet 5.
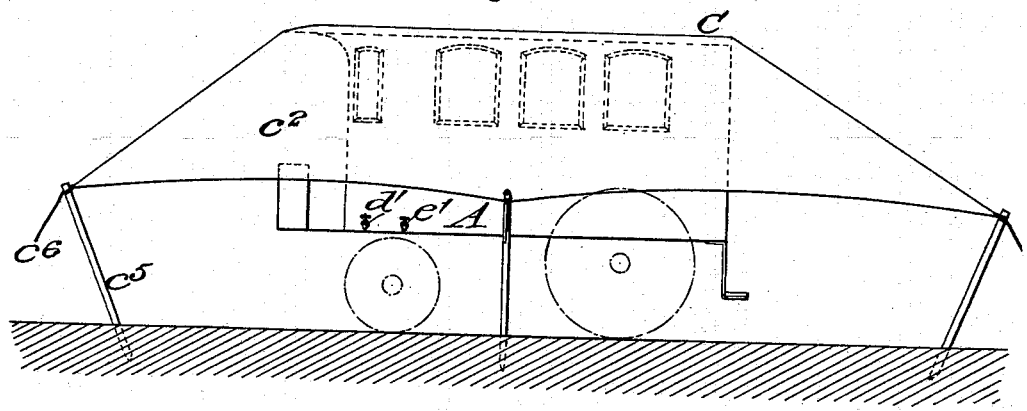
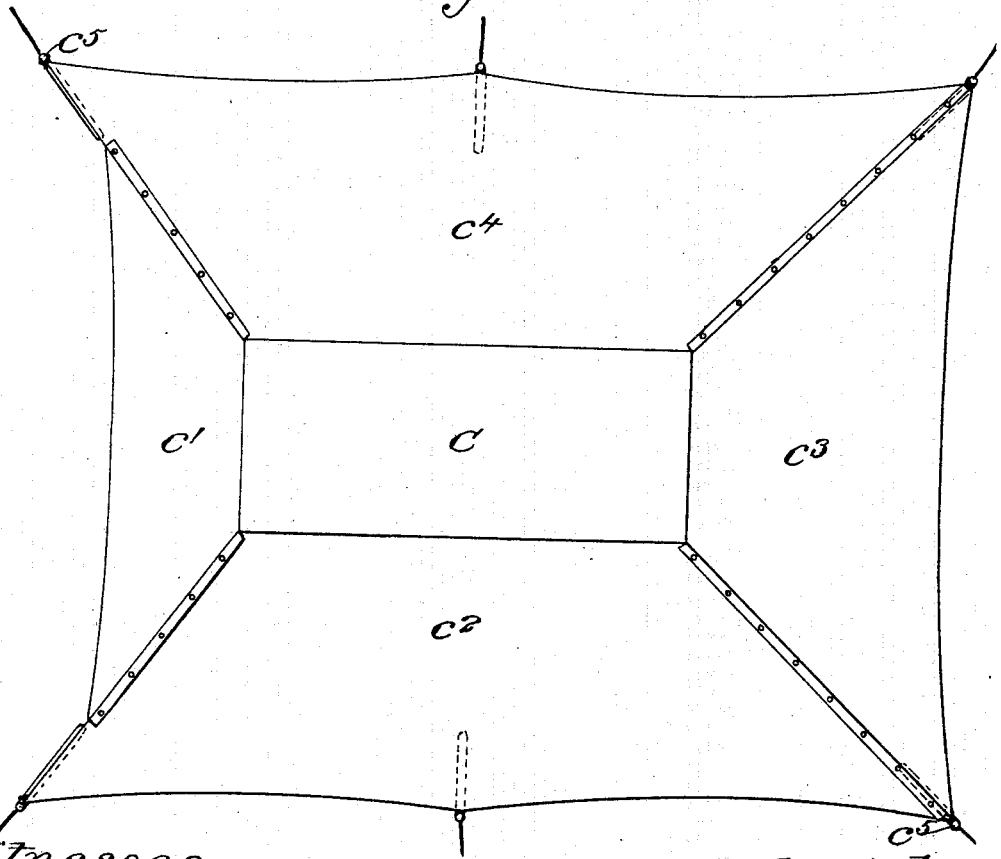
Witnesses:
George Barry Jr.
Edward Vieser.
Inventor
Cornelius H. W. Larrabee
by attorneys
THE NORRIS PETERS CO., PHOTO-LITHO., WASHINGTON, D. C.

UNITED STATES PATENT OFFICE.

CORNELIA H. W. LARRABEE, OF NEW YORK, N. Y.

COMBINED AMBULANCE AND TOURIST-WAGON.

SPECIFICATION forming part of Letters Patent No. 615,396, dated December 6, 1898.

Application filed July 29, 1898. Serial No. 687,172. (No model.)

*To all whom it may concern:*

Be it known that I, CORNELIA H. W. LARRABEE, a citizen of the United States, and a resident of New York, in the county and State of New York, have invented a new and useful Improvement in a Combined Ambulance and Tourist-Wagon, of which the following is a specification.

My invention relates to an improvement in a combined ambulance and tourist-wagon, the object being to provide a vehicle which will be eminently adapted for uses to which it is to be put, the interior arrangement of the vehicle being such that it can be readily converted from an ambulance into a tourist-wagon, and vice versa.

A practical embodiment of my invention is represented in the accompanying drawings, in which—

Figure 1 represents a view in side elevation of the body portion of the vehicle, its traction-wheels being indicated by dotted lines, and the shelter-tent, which is carried by the roof of the vehicle, being represented in its folded position. Fig. 2 is a longitudinal central section through the vehicle-body. Fig. 3 is a transverse section in the plane of the line 3 3 of Fig. 1, looking toward the rear. Fig. 4 is a similar view in the plane of the line 4 4 of Fig. 1, looking toward the rear. Fig. 5 is a similar view in the plane of the line 5 5 of Fig. 1, looking toward the rear. Fig. 6 shows a side view of my improved litter when unfolded into position for use. Fig. 7 is a top plan view of the same. Fig. 8 is a view similar to Fig. 1, on a smaller scale, with the shelter-tent shown spread, as in use; and Fig. 9 is a top plan view of the same.

The side walls of the vehicle-body are denoted by A A', the floor by $A^2$, and the roof by $A^3$. The vehicle may be supported upon any suitable running-gear—such, for instance, as two pairs of wheels. These wheels may be provided with wide tires, as indicated in the accompanying drawings, or they may be provided with pneumatic or cushion tires, if so desired. At the rear of the vehicle-body there may be provided a step $a$, supported by depending hangers $a'$, secured to the rear end of the bottom or floor $A^2$ of the vehicle-body. A dashboard $a^2$ uprises from the front end of the floor $A^2$, as shown. The sides of the vehicle-body may be provided with suitable windows $a^3$, by means of which a sufficient supply of light may be furnished to the interior of the vehicle, and the said windows may be arranged to open and close for purposes of ventilation.

The roof $A^3$ of the vehicle-body is provided with a shelter-tent C, which is adapted to be folded up on top of the said roof when it is not in use. Fasteners $c$ may be used for holding the shelter-tent in its folded position on the roof, and when it is desired to spread the tent the fasteners $c$ may be released and the several flaps $c'$ $c^2$ $c^3$ $c^4$ of the tent may be unfolded and their edges brought together, as shown in Fig. 9. Tent-poles $c^5$ may then be engaged with the edges of the tent and with the ground. Guide ropes or cords $c^6$ may be used to secure the tent to the ground. The front flap $c'$ of the tent is of considerably less width than the other flaps of the tent, so as to secure ready ingress and egress when the tent is spread or set up. The meeting edges of the flaps may be buttoned or otherwise secured together, if so desired.

A compartment or trough is formed between the dashboard $a^2$ and a partition $a^4$, which uprises from the floor $A^2$, which compartment may be filled with feed for the animals which are intended to draw the vehicle. This trough may have a swinging cover $a^5$ for keeping the compartment dry. Immediately in the rear of the partition $a^4$ and at each end thereof I provide guides $a^6$ for the reception of the ends of the several tent-poles $c^5$, thereby forming a convenient storage place for the said tent-poles and one from which they may be quickly and readily removed when it is desired to spread the tent.

The driver's seat of the vehicle is formed by two transversely-extended tanks or reservoirs D E, the front one D being intended to hold a supply of water for drinking purposes and the rear compartment E being intended for the reception of ice. The top of the tank or reservoir D is provided with a hinged cover $d$ and the top of the tank E is similarly provided with a hinged cover $e$. The proximity of the water-tank to the ice-tank tends to keep the water cool. Cocks $d'$ $e'$ lead through the side A of the vehicle-body from the tanks D and E to the exterior, whereby cool water may be drawn from the tank D and ice-water from the tank E.

A partition F is located immediately to the rear of the tank E, and the said partition is provided with a central opening from a point a short distance above the tops of the tanks D and E to the roof of the vehicle-body, so as to permit access to the interior of the vehicle-body from the front of the vehicle.

Closets G G' are located opposite each other along the sides of the vehicle-body in front of the partition F. These closets may be provided with doors $g\ g'$, as shown, for protecting the articles located therein from dust, dirt, &c. These closets may be divided transversely by partitions $g^2\ g^3$, so as to form upper and lower compartments, as shown. Suitable food supplies may be carried in these closets as found necessary.

A second pair of closets H H' are located opposite each other at the rear of the vehicle-body along the sides thereof. These closets extend from the roof to a point a considerable distance above the floor $A^2$. The closet H may be provided with a door $h$ and may be divided transversely into two compartments by a partition $h'$. The lower compartment may be utilized for the reception of sanitary vessels and the upper compartment may contain surgical instruments and supplies generally. The closet H' is provided with a door $h^2$, and it is divided transversely into three compartments by partitions $h^3\ h^4$. The lower compartment may contain dishes, the middle compartment a heating-lamp, and the upper compartment a tank for receiving water which it is intended to heat for use in preparing hot beverages. One wall of the compartment in which the lamp is situated may have a window $h^5$, so that the lamp will provide light for the interior of the vehicle at night.

Berths I I' are located along the opposite sides of the vehicle and are mounted at their opposite ends in guides $i\ i'$, so that the said berths may be lowered into position for use at a point about half-way between the floor and roof and may be raised to a position immediately beneath the roof and held there when not in use. Folding brackets $i^2\ i^3$ are located along the sides of the vehicle in position to swing out underneath the berths I I' when in their lowered position, forming an additional support therefor. The guides $i\ i'$ are so arranged that when the ends of the berths I I', which engage the vertical grooves in the guides $i\ i'$, are raised to points adjacent to the roof the said berths may be slid laterally and outwardly a short distance until their outer longitudinal bars $i^4\ i^5$ drop into suitable recesses $i^6\ i^7$ near the tops of the said grooves. The berths will thus be locked in their raised positions.

A pair of longitudinally-folding litters J J' are arranged to be inserted through the rear of the vehicle-body into positions longitudinally of the vehicle, with a slight space between them. Each of these litters comprises a stretcher portion consisting of two sections $j\ j'$, hinged together along their longitudinal adjacent edges, so as to swing into the same plane and into planes at right angles to each other. The stretcher is further provided with two sets of traction-wheels $j^2\ j^3$, so that the litter may be wheeled along when so desired. The litter is also provided at its opposite ends with pairs of arms $j^4\ j^5$, which may be grasped by persons who are carrying the litter. Carrying-straps $j^6\ j^7$ engage these arms. Two or more straps $j^8\ j^9$ are located along the litter in position to strap the occupant thereof firmly in position thereon. A sectional folding foot-rest $j^{10}$ is hinged to the sections $j\ j'$ at one of their ends, and it is held in its raised position by hooks $j^{11}$, extending between the free end of the foot-rest and the litter. Turn-buttons $j^{12}\ j^{13}$ are pivoted to the sections $j\ j'$ in position to lock the two sections in the same plane when the litter is set up for use. The floor $A^2$ of the vehicle is provided with longitudinal guides $a^7\ a^8$, which serve to guide the outer wheels of the litters as the litters are rolled into and out of the vehicle.

When it is desired to use the litters as seats, the sections are swung into planes at substantially right angles to each other, and the lower edge of the vertical section is caused to engage suitable guide-strips $a^9\ a^{10}$ in the floor $A^2$ about half-way between the guides $a^7\ a^8$ and the sides of the vehicle-body.

The rear of the vehicle may be provided with doors $a^{11}\ a^{12}$, which are intended to close more or less of the end of the vehicle, as may be desired.

In operation when the vehicle is used as a tourist-wagon the litters are folded to form seats, as shown, and at night the berths I I' are lowered from their position adjacent to the roof of the vehicle and the beds are made up thereon. When the vehicle is to be used as an ambulance, the berths are raised to their positions adjacent to the roof and the litters J J' are set up into position for use.

From the above description it will be seen that the vehicle which I have invented is very complete in its appointments and that all of the available space has been utilized advantageously.

What I claim is—

1. A combined ambulance and tourist-wagon comprising a vehicle-body having a pair of closets in its rear end and a second pair of closets in its forward end, a berth located along the side of the interior of the vehicle-body between each pair of closets and means for supporting the berth in its raised position in proximity to the roof and in its lowered position a distance beneath the same, substantially as set forth.

2. A combined ambulance and tourist-wagon comprising a vehicle-body, a tent carried by the roof thereof, poles for stretching the tent and guides uprising from the floor of the vehicle-body at points to the rear of the dashboard for receiving and retaining the tent-poles between them when not in use, substantially as set forth.

3. A combined ambulance and tourist-wagon comprising a vehicle-body, a vertically-sliding berth therein, guides for the said berth, a swinging bracket arranged to fold against the side of the vehicle-body when not in use and unfold into position to support the berth when in its lowered position, substantially as set forth.

4. A combined ambulance and tourist-wagon comprising a vehicle-body, a movable litter therein and guides in the floor of the vehicle-body for retaining the litter in its position against all lateral movement, substantially as set forth.

5. A combined ambulance and tourist-wagon comprising a vehicle-body and a driver's seat composed of two tanks extended transversely across the vehicle-body, one tank arranged to receive ice and the other water, substantially as set forth.

In testimony that I claim the foregoing as my invention I have signed my name, in presence of two witnesses, this 27th day of July, 1898.

CORNELIA H. W. LARRABEE.

Witnesses:
FREDK. HAYNES,
C. S. SUNDGREN.